United States Patent [19]

Arens

[11] Patent Number: 5,089,988
[45] Date of Patent: Feb. 18, 1992

[54] METHOD AND APPARATUS FOR COMPENSATING SENSITIVITY FLUCTUATIONS IN A HYDROPHONE TRANSDUCER ARRAY

[75] Inventor: Egidius Arens, Achim, Fed. Rep. of Germany

[73] Assignee: Krupp Atlas Elektronik GmbH, Bremen, Fed. Rep. of Germany

[21] Appl. No.: 631,462

[22] Filed: Dec. 21, 1990

[30] Foreign Application Priority Data

Dec. 22, 1989 [DE] Fed. Rep. of Germany ....... 3942588

[51] Int. Cl.$^5$ ............................................. H04B 17/00
[52] U.S. Cl. ......................................... 367/12; 367/13; 367/129; 367/135; 310/337; 73/1 DV
[58] Field of Search ................... 367/12, 13, 98, 97, 367/95, 129, 131, 135, 153, 900, 153; 310/337; 73/1 DV

[56] References Cited

U.S. PATENT DOCUMENTS

| | | | |
|---|---|---|---|
| 3,810,082 | 5/1974 | Arens | 367/122 |
| 3,903,505 | 9/1975 | Tims | 367/140 |
| 4,090,169 | 5/1978 | Adair et al. | 367/13 |
| 4,486,862 | 12/1984 | Wyber | 367/13 |
| 4,689,578 | 8/1987 | Spychalski | 367/13 |
| 4,748,598 | 5/1988 | Kopke | 367/13 |
| 4,893,284 | 1/1989 | Magrane | 367/12 |
| 5,010,525 | 4/1991 | Skinner et al. | 367/13 |

Primary Examiner—J. W. Eldred
Attorney, Agent, or Firm—Spencer & Frank

[57] ABSTRACT

A method and apparatus for compensating sensitivity fluctuations in signals received from respective groups of hydrophones for the purpose of subsequent signal processing, the groups being arranged in a predetermined sequence (0, 1, 2, . . . i) to form a transducer arrangement, wherein the received signals are influenced by the sensitivity of the hydrophones and/or the gain of preamplifiers connected to the outputs of the hydrophones. The energy value ($W_i$) for the received signals of each group of hydrophones is determined and a median energy curve ($W_m(\theta)$) is derived from the energy values ($W_i$) as a function of the sequence of the groups of hydrophones. A correction value is formed for the signals received from each group of hydrophones from a comparison of the respective energy value ($W_i$) with the energy curve ($W_m(\theta)$) and the received signals are corrected with the correction value.

17 Claims, 4 Drawing Sheets

METHOD AND APPARATUS FOR COMPENSATING SENSITIVITY FLUCTUATIONS IN A HYDROPHONE TRANSDUCER ARRAY

CROSS REFERENCE TO RELATED APPLICATION

The present application claims the rights of priority of application Serial No. P 39 42 588.6, filed in the Federal Republic of Germany, the subject matter of which is incorporated herein by reference.

BACKGROUND OF THE INVENTION

The present invention relates to a method of compensating sensitivity fluctuations in signals received from hydrophones, or hydrophone arrays referred to as staves, disposed in a transducer arrangement, for the purpose of subsequent signal processing, for example in a sonar system, wherein the received signals are influenced by the sensitivity of the hydrophones and/or the gain of preamplifiers connected to the outputs of the hydrophones.

Such a method is disclosed, for example, in U.S. Pat. No. 4,090,169. In this method, operational data from hydrophones or hydrophone arrays, so-called staves, are determined in a special measuring apparatus in which a transmitting transducer is positioned at a defined distance directly opposite the hydrophone to be surveyed. The phases and amplitudes of the hydrophones are then measured relative to one another on the basis of the transmitted signal and are matched to one another by means of external calibrating means so that, for a plane wave, the signals of predetermined frequencies received from the hydrophones have the same amplitudes and phases. Such a method requires expensive, special measuring devices and permits calibration of the hydrophones only under the conditions predetermined by the calibration structure. Additional changes in the operating data, as they may occur as a result of the inclusion of another hydrophone or hydrophone array in the operation, are by nature not detected and thus not corrected either.

SUMMARY OF THE INVENTION

It is an object of the present invention to determine fluctuations in the sensitivity of hydrophones, or staves, during operation and to compensate them directly, thus improving the directional characteristic of the transducer arrangements equipped with such hydrophones or staves.

The above and other objects are accomplished according to one aspect of the invention by the provision of a method of compensating sensitivity fluctuations in signals received from respective groups of hydrophones for the purpose of subsequent signal processing, the groups being arranged in a predetermined sequence (0, 1, 2, . . . i) to form a transducer arrangement, wherein the received signals are influenced by the sensitivity of the hydrophones or a gain of preamplifiers connected to the outputs of the hydrophones, comprising: determining an energy value ($W_i$) for the received signal of each group of hydrophones; determining a median energy curve ($W_m(\theta)$) from the energy values ($W_i$) as a function of the sequence of the groups of hydrophones; forming a correction value for the signal received from each group of hydrophones from a comparison of the respective energy value ($W_i$) with the energy curve ($W_m(\theta)$); and correcting each received signal with a respective one of the correction values.

According to another aspect of the invention there is provided an apparatus for implementing the foregoing method which comprises a circuit for compensating sensitivity fluctuations in signals received from respective groups of hydrophones for the purpose of subsequent signal processing, the groups being arranged in a predetermined sequence (0, 1, 2, . . . i) to form a transducer arrangement, wherein the received signals are influenced by the sensitivity of the hydrophones or a gain of preamplifiers connected to the outputs of the hydrophones, comprising: a plurality of preamplifiers each coupled for receiving the signals from a respective one of the groups of hydrophones and producing amplified received signals; squaring and integration means coupled via first connection means to the respective preamplifiers for forming an energy value ($W_i$) of the amplified received signal for each group of hydrophones; correction value computing means connected to the squaring and integration means for determining a median energy curve ($W_m(\theta)$) for the signals received from the groups of hydrophones and calculating correction values ($K_i$) as a function of the median energy curve ($W_m(\theta)$) for the signals received from each group of hydrophones; and multiplier means having one input connected via second connection means to the plurality of preamplifiers and a second input connected for receiving the correction values ($K_i$) from the correction value computing means, the multiplier means multiplying each amplified received signal with a respective one of the correction values ($K_i$) to produce received signals corrected with the respective correction values at its output.

According to a further aspect of the invention there is provided another embodiment of an apparatus for implementing the foregoing method which comprises a circuit for compensating sensitivity fluctuations in signals received from respective groups of hydrophones for the purpose of subsequent signal processing, the groups being arranged in a predetermined sequence (0, 1, 2, . . . i) to form a transducer arrangement, wherein the received signals are influenced by the sensitivity of the hydrophones or a gain of preamplifiers connected to the outputs of the hydrophones, the circuit including: a plurality of preamplifiers each coupled for receiving the signals from a respective one of the groups of hydrophones and producing amplified received signals; squaring and integration means coupled via first connection means to the respective preamplifiers for forming an energy value ($W_i$) of the amplified received signal for each group of hydrophones; correction value computing means connected to the squaring and integration means for determining a median energy curve ($W_m(\theta)$) for the signals received from the groups of hydrophones and calculating correction values ($K_i$) as a function of the median energy curve ($W_m(\theta)$) for the signals received from each group of hydrophones; and direction forming means, having one input connected via second connection means to the plurality of preamplifiers and a second input connected for receiving the correction values ($K_i$) from the correction value computing means, the direction forming means determining the direction of incidence of the received signal on the transducer arrangement by way of coefficient multipliers which are combined with the correction values ($K_i$).

As used herein, a "group of hydrophones" may include one or more hydrophones, so that groups of hydrophones disposed in a transducer arrangement may include individual hydrophones sequentially disposed in a transducer arrangement or staves, i.e. hydrophone arrays including two or more hydrophones, disposed sequentially in a transducer arrangement.

For transducer arrangements, it is necessary to carefully match the operating parameters of the hydrophones or staves, for example, vertically arranged hydrophones combined into arrays. Any fluctuations have a direct influence on the side lobe attenuation of the directional characteristic of the transducer arrangement. Only if the direction formation, i.e. determination of angle of incidence to the transducer arrangement, is made with received signals which, in the ideal case, include no phase or amplitude errors, is it possible to expect good focusing and optimum side lobe attenuation.

The signal received from a hydrophone or stave whose energy can be determined at the output of the preamplifier stage, possibly after analog to digital (A/D) conversion, is composed of a noise component $W_N$ and a signal component $W_S$. The signal component $W_S$ is here additionally influenced by the inherent directional effect $R(\theta)$ of the transducer base. The received signals resulting from these signal components are a function of the sensitivity $E_{Ei}$ of the hydrophones or hydrophone arrays and the gain factor $V_i$ of the preamplifiers. Thus, for each hydrophone or stave, the energy $W_i$ of the received signals can be described as follows:

$$W_i = V_i^2 \cdot E^2_{Ei} [W_N + W_S \cdot R^2(\theta_s - \theta_i)] \quad (1)$$

where $\theta_s$ is the direction of incidence of the received signal and $\theta_i$ is the direction of the corresponding hydrophone or stave.

The part of Equation (1) characterized by the sensitivity $E_{Ei}$ and the gain $V_i$ can also be asumed to be composed of a component $V_b$ which is considered to be known and a component $\Delta_i \cdot V_b$ which considers the fluctuation in sensitivity of the hydrophones and the changes in gain and is described by the following equation:

$$V_i^2 \cdot E^2_{Ei} = V_b \cdot (1 + \Delta_i) \quad (2)$$

The known term $V_b$ results directly from the product of the median gain and the sensitivity and either must be given, or as will be described below, assumed to be contained in the mean of the energy curve $W_i(\theta)$ and is then included in the determination of the factors by orthogonal transformation into the coefficient of a series development.

For, if one develops, according to Equation (1), the energy $W_i$ of the hydrophones, or staves, of the transducer arrangement from a series of orthogonal functions, in which case a Fourier series appears to be suitable for a cylindrical transducer base, the following relationship can be defined for each stave:

$$W_i = (1 + \Delta_i) \cdot (A_0 + A_1 \cos \theta_i + A_2 \cos 2\theta_i + \ldots \quad (3)$$
$$B_1 \sin \theta_i + B_2 \sin 2\theta_i + \ldots)$$

where the coefficients $A_0, A_1, A_2, \ldots$ and $B_1, B_2, \ldots$, are the series coefficients, here the Fourier coefficients.

From the above equations, a correction value $K_i$ for each hydrophone or stave can now be described directly as follows:

$$K_i = (1 + \Delta_i)^{-\frac{1}{2}} = \quad (4)$$

$$\left( \frac{W_i}{A_0 + A_1 \cos \theta_i + \ldots + B_i \sin \theta_i + \ldots} \right)^{-\frac{1}{2}}$$

Because of the large number of energy values measured for all hydrophones of the transducer arrangement, there usually result multiple solutions for the coefficients. In this way, compensatory calculation methods or estimation methods, for example regressive calculations, can be employed to particular advantage and the fluctuation of the coefficients can further be compensated to optimize the correction value $K_i$ on the basis of the totality of the measuring results.

The method according to the invention has the advantage that the fluctuation of the hydrophone sensitivity is determined and compensated in the installed operational state. No expensive disassembly measures need be taken and no comparison measurements need to be made to calibrate and match all hydrophones of an array. Furthermore, no additional transmitting generator is required for the measuring structure since during operation the received signals can be utilized directly for the calibration. A significant advantage of the present invention is therefore that changes in the operating parameters due to aging, temperature or other environmental influences are detected and compensated directly during each measuring process so that no special test conditions need be created.

According to a further advantageous aspect of the method of the invention, the energy values are averaged over time, producing in a relatively simple manner a substantially steady energy curve which is further smoothed by regression, that is a compensatory calculation in the sequence of the hydrophones or staves as they are disposed on the transducer base.

According to another advantageous aspect of the method of the invention, the principles of linear transformation are adapted substantially to the energy curve to be approximated to produce, with few elements, an approximated median, low-error energy curve. Thus it is of advantage to employ, for an approximation of the periodic energy curve through the succession of hydrophones or staves, the transformation principles of the Fourier transformation, that is, circular functions, for example for cylindrical transducer arrays, and of the Legendre polynomials for an elongated antenna including a plurality of longitudinally arranged hydrophones of staves.

In yet another advantageous aspect of the method of the invention, due to the formation of a correction value which is the difference between the energy value and the median energy curve, subsequent signal processing, which is then no longer performed with received signals but with energy values, is performed on the basis of the corrected, compensated energy curve; that is, signal processing is based on optimized energy signals.

The novel apparatus for implementing the method of the invention has the advantage that the correction values are determined in a simple manner in a circuit branch connected in parallel with the connection between the preamplifiers and the signal processing device connected to its output. According to one preferred embodiment of the apparatus according to the invention, the correction values, already determined in the correction computer, are additively combined or electronically multiplied with the coefficients of the coefficient multiplier in the direction former. In this way, it is possible to simplify the apparatus by eliminating a multiplier at the input of the signal processing device.

According to another aspect of the novel apparatus, extreme correction values, which occur whenever hydrophones or amplifiers are malfunctioning, are detected and cause the falsified received signal to be blocked. This improves the processing of the signals and avoids charging them unnecessarily with "runaways."

The invention will now be described in greater detail with reference to the accompanying drawing figures.

DETAILED DESCRIPTION OF THE PREFERRED EMBODIMENTS

Figure 1:
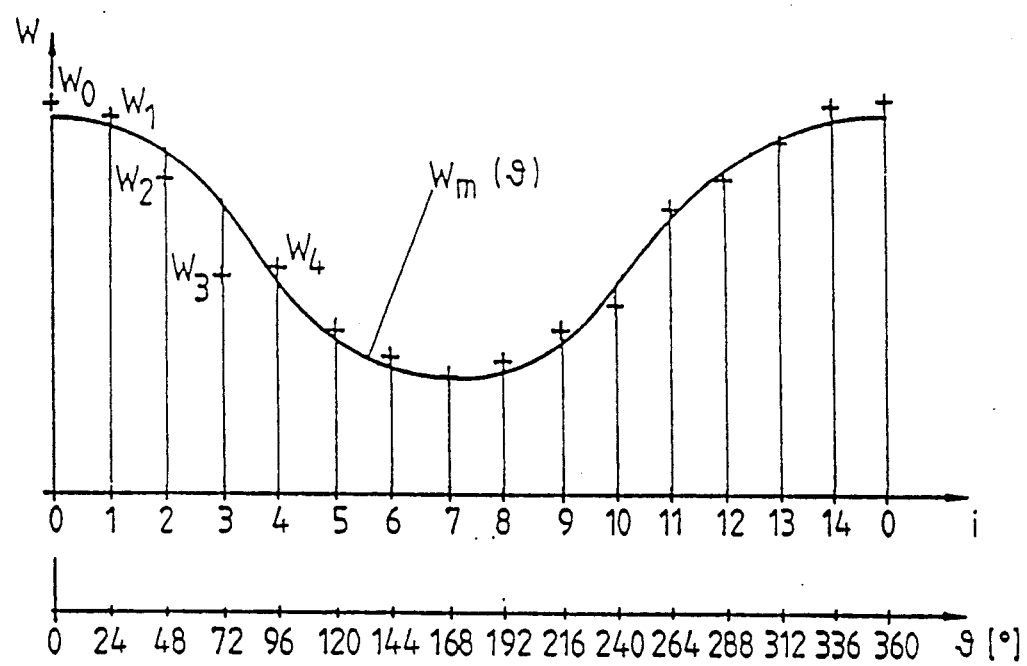
FIG. 1 is a graph which shows the energy values and average energy curve formed thereby of a cylindrical transducer array.

Referring to FIG. 1, there is shown the energy values $W_i$ and a median energy curve $W_m(\theta)$ for a cylindrical transducer arrangement. For the sake of simplicity, it is assumed that the transducer array includes fifteen groups of hydrophones, i.e. fifteen hydrophones or staves, which are given the indices $i=0$ to 14 on the abscissa. There is also given a second, completely equivalent abscissa legend which is marked as directional angles $\theta$, that is, it is marked relative to a 0° direction of the transducer base, i.e. the orientation of hydrophone 0 (see FIG. 2), with corresponding azimuthal directions of the individual hydrophones or staves as shown. The energy $W_i$ of the signals received from the hydrophones or staves is plotted on the ordinate, without this being to scale in each individual case. The values measured for the energy $W_i$ of each hydrophone or stave, are marked by crosses and therefore a median energy curve $W_m$ is given as a function of the azimuthal direction $\theta$ which results, for example, from a regression calculation, i.e. from a compensatory calculation between energy values $W_i$.

The deviations of the measured energy values $W_i$ from the median energy curve $W_m(\theta)$ are caused by fluctuations in sensitivity of the hydrophones and/or by amplifier errors. The energy function value $W_{mi}$ that can be determined for each stave i from the median energy curve $W_m(\theta)$ is thus available as a comparison value for each energy value $W_i$ obtained from the measurements. A correction value for each stave can thus be obtained by forming a difference between the energy value ($W_i$) and the median energy curve ($W_m(\theta)$). The correction values are then added to the respective energy values ($W_i$) during signal processing for determining the corrected energy values.

Alternatively, the correction value can be determined from the square root of the quotient $W_{mi}/W_i$, that is from the function value $W_{mi}$ on the median energy curve for each hydrophone or stave and the measured energy value $W_i$, and can be employed as a correction factor for the signal received from each stave. The received signal, multiplied by such a correction value and fed into a direction former, is then optimally smoothed and adapted to the median energy curve $W_m(\theta)$ of the transducer array so that the direction formation is also performed without error containing received signals and is therefore likewise optimized.

The illustrated cosine shaped median energy curve $W_m(\theta)$ clearly indicates that it can also be approximated by a Fourier series as shown in Equation (3). For this purpose, the energy values $W_i$ are subjected to an FFT (fast Fourier transformation) and the Fourier coefficients $A_0, A_1, A_2, \ldots, B_1, B_2, \ldots$, of the Fourier series are determined. Particularly if the energy values do not exhibit very large deviations from the mean energy curve, a sufficiently good approximation to the ideal energy curve $W_m(\theta)$ can be determined with suitable FFT algorithms with only a few coefficients. Thus, according to Equation (4), the correction values $K_i$ can be determined as follows:

$$K_i = \left(\frac{W_m(\theta_i)}{W_i}\right)^{\frac{1}{2}} =$$

$$\left(\frac{(A_0 + A_1 \sin \theta_i + \ldots + B_1 \sin \theta_i + \ldots)}{W_i}\right)^{\frac{1}{2}}$$

If, however, an antenna array is present which is elongate and linear, for example an acoustic trailing antenna, it is appropriate to form, instead of the Fourier series, a series of Legendre polynomials and to determine the corresponding series coefficients. The energy curve of the longitudinal antenna is better approximated by these Legendre polynomials, for example, $$L_n(\theta) = \frac{1}{2^n n!} \cdot \frac{d^n[(\theta^2 - 1)^n]}{d\theta^n}$$

where $n = 0, 1, 2, \ldots, N$

However, this changes nothing in the basic determination of the correction coefficients for the received signals of the respective hydrophones.

Figure 2:
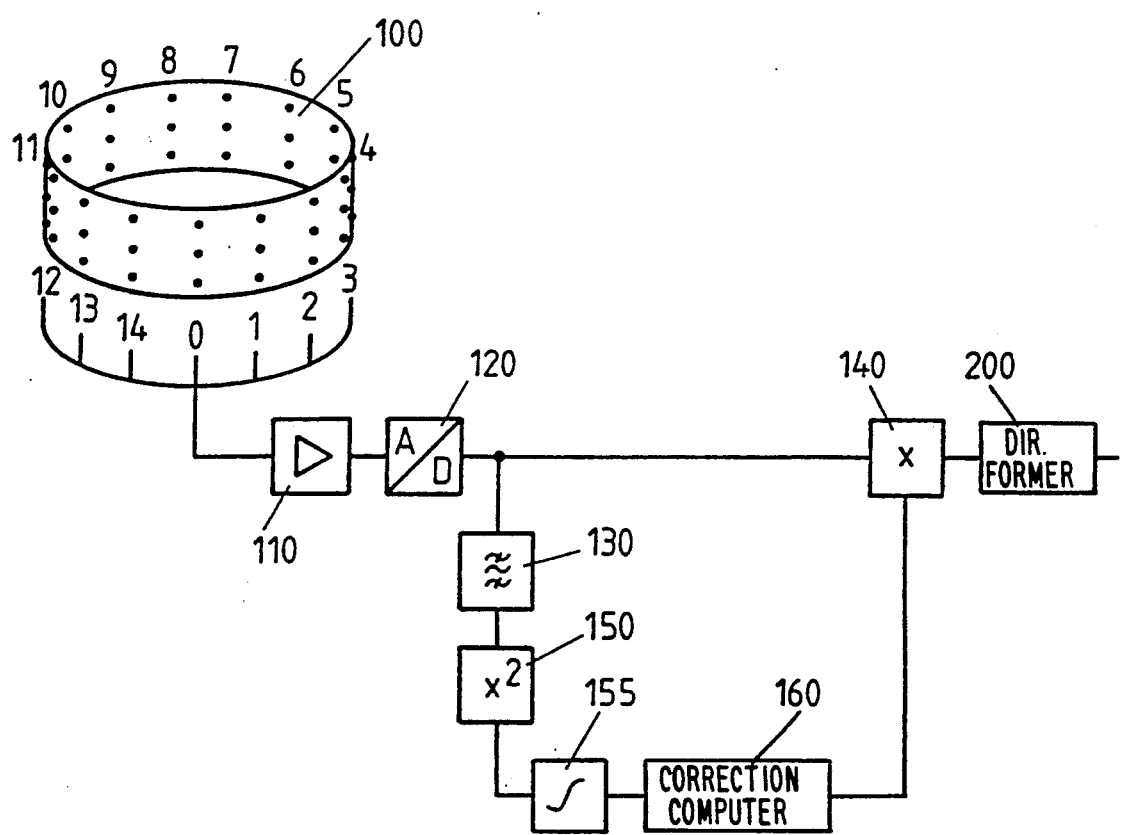
FIG. 2 shows a schematic of a hydrophone transducer array and a block circuit diagram for determining correction values from stave signals of the transducer according to one embodiment of the invention.

FIG. 2 is a block circuit diagram for an apparatus for implementing the method according to the present invention. A transducer array 100 has a basic cylindrical shape which is composed, for example, of fifteen staves. The staves are comparably disposed, in the tangential direction, to the azimuthal directions $\theta$ and are marked with the indices $i=0$ to 14. Each stave i, that is, each hydrophone array, is composed of three vertically superposed hydrophones which are interconnected so as to vertically bundle the received signal. The output signals of all staves i, as will be described below, are processed further, completely in parallel, in separate signal processing circuits and are combined only when the direction angle is formed in a direction former 200, the operation of which, per se, is known in the art. The corresponding components are thus each provided i times except the correction computer 160 having i corresponding inputs and outputs instead without this having to be illustrated in detail.

If, however, sufficient time is available to process the stave signals, a single signal processing device can be realized which then scans the staves, processes the stave signals in multiplex and feeds them to the direction former in succession.

Figure 4:
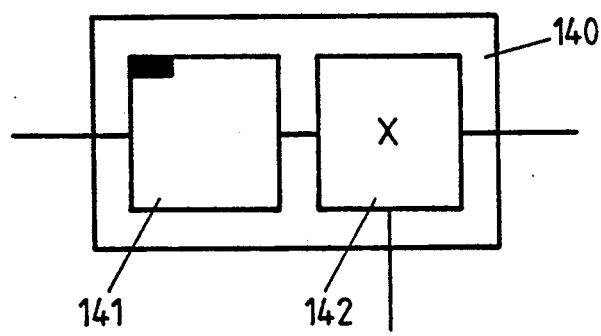
FIG. 4 shows a multiplier with a multiplier circuit and an intermediate storage for storing the multiplier input data until the corresponding correcting values are processed.

In the embodiment shown in FIG. 2, the staves i are each connected with a respective preamplifier 110 which is followed by an A/D converter 120. The A/D converter 120 is connected with a band limitation filter 130 for the received signal required for the energy value determination and a first input of a multiplier 140. The output of filter 130 is connected with a squaring circuit 150 and an integrating circuit 155 for forming the energy values from the received signal of each stave i. These energy values are transferred to a correction computer 160 in which the correction values $K_i$ of each stave i are determined and fed to the second input of multiplier 140, which desirably includes an intermediate storage 141 for input data and the multiplier circuit 142 as shown in FIG. 4. Thus, a received signal multiplied by the correction value $K_i$ that is typical for each stave i is available at the output of multiplier 140 and is fed to the direction former 200.

Without this having to be illustrated in detail, direction former 200 is equipped with delay circuits for the corrected received signals of the staves, coefficient multipliers for evaluating the stave signals in a manner appropriate for processing and summing circuits for the evaluated stave signals which have been correctly delayed as a function of their direction.

In the operation of the apparatus according to the present invention it is assumed that the operating parameters of the hydrophones in the staves i of transducer array 100 will be influenced to a particularly great degree by manufacturing tolerances as well as by aging or environmental influences. They deviate from the originally defined operating data either right from the start or over the course of time. The same applies for preamplifiers 110 which are frequently installed in the immediate vicinity of the hydrophones or staves and are subjected to considerable fluctuations in temperature and humidity. Thus, the received signals of the hydrophones or staves are directly influenced by the product of sensitivity and gain. It is therefore necessary to correct the signals, particularly during operation. For this purpose, the natural damping behavior of transducer array 100 is utilized which, for example, produces a basic energy curve $W_m(\theta)$ as shown in FIG. 1 from a signal received from the direction of stave 0. If the energy values $W_i$ deviate from this median optimum curve, as shown for example for energy value $W_3$, the reasons for the error must be expected to originate primarily from the hydrophone and the preamplifier. Since neither the direction of incidence of the signals nor the momentary signal level is known during operation, the median energy curve $W_m$ must first be determined from the measured energy values $W_i$. For this purposes the signals are squared and integrated. By employing an orthogonal transformation, such as a Fourier transform, an approximation of the energy curve is determined in correction value computer 160 from these energy values $W_i$. Particularly if the transform has already been well adapted to the expected curve, this requires the determination of only a few transformation coefficients to develop a series. The output signal of correction value computer 160 is then the correction value $K_i$ for stave i, for example, as the square root of the ratio of the median energy value $W_{mi} = W_m(\theta_i)$ to the received energy value $W_i$, with which the received signal is multiplied in multiplier 140. In the subsequently connected direction former 200, an improved direction formation then takes place with signals which are substantially free of sensitivity and gain fluctuations.

Figure 3:
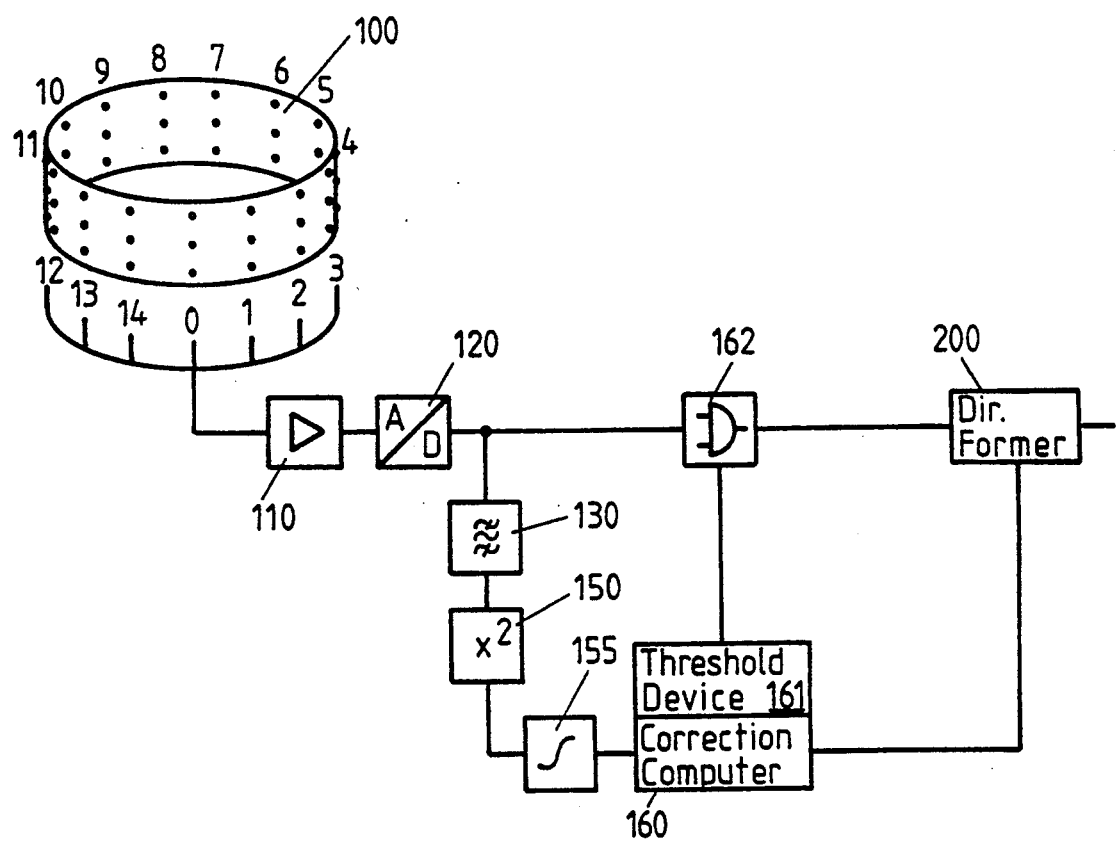
FIG. 3 is similar to FIGS. 2, showing another embodiment of the block circuit diagram for determining correction values from stave signals.

A simplification of the device utilizing the multiplier 140 of the embodiment shown in FIG. 2 results if multiplier 140 is omitted and the output of correction value computer 160 is connected, as shown in FIG. 3, wherein the components corresponding to those in FIG. 2 are identified by the same reference numerals. In the embodiment shown in FIG. 3 the correction values are directly linked with the multiplication factors used in the formation of the direction angle. In this case, the received signals of staves i need be multiplied only once with a factor which includes the criteria for the direction formation and the correction value for sensitivity fluctuations.

The correction value computer 160 may also easily be equipped with a threshold checking device 161 as shown in FIG. 3 which suppresses extreme correction values. This measure is appropriate, for example, if individual staves or amplifiers are totally malfunctioning. Energy values $W_i$ then become very small and consequently the correction value becomes very large. Such a correction value, if it exceeds a predetermined threshold, can then be utilized as a turn-off criterion for the gate 162 in the signal processing branch of the respective stave and can also be excluded during signal processing in direction former 200.

A direction former 200 is well known in the art, see for instance U.S. Pat. No. 3,810,082. The disclosed direction former contains the delaying, adding and coefficient multiplying circuits necessary for beam or direction forming on the base of the different stave signals. The staggered value signal generator of this circuit arrangement can be forced to combine the correction values with the staggering values in an additional simple multiplication. As the direction former 200 is a linear system it is equivalent either to multiply its input signal within the multiplier 140 with the correction values of correction computer 160 or first to multiply the staggered values of the direction former 200 with the correction values and then do the direction forming.

Figure 5:
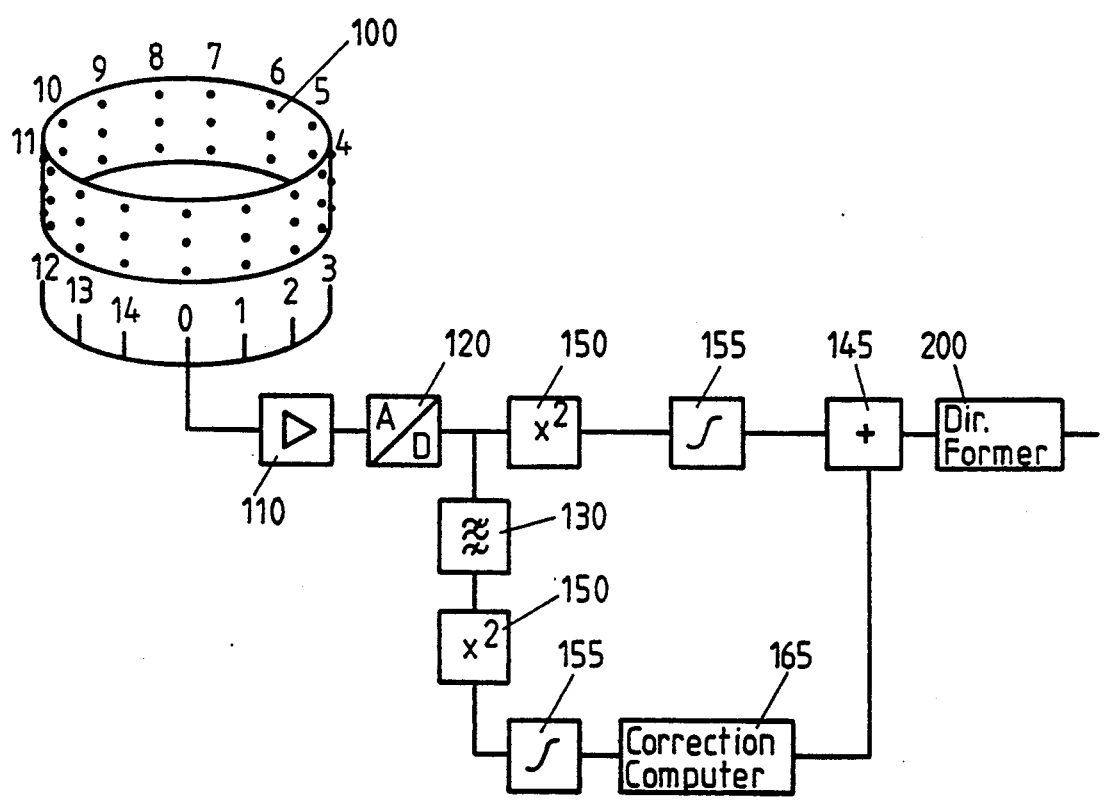
FIG. 5 is comparable to FIG. 2 showing an alternate embodiment of the invention for signal processing of energy values by adding correction values.

An alternative embodiment of the invention which is comparable to FIG. 2 is shown in FIG. 5, wherein the components corresponding to those of FIG. 2 are identified by the sam numerals. In the signal processing branch between A/D converter 120 and direction former 200 another squaring circuit 150 and integration circuit 155 have been included for the evaluation of the energy values $W_i$. These energy values $W_i$ are transferred to an adding circuit 145 of which the other input is coupled to a modified correction computer 165. The only modification of this correction computer 165 compared to correction computer 160 in FIG. 2 is that the outputs produce difference values as correction values instead of quotients, whereby these difference values are determined by subtracting the energy values $W_i$ from the median energy curve $W_m$.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A method of compensating sensitivity fluctuations in signals received from respective groups of hydrophones for the purpose of subsequent signal processing, the groups being arranged in a predetermined sequence (0, 1, 2, . . . i) to form a transducer arrangement, wherein the received signals are influenced by the sensitivity of the hydrophones or a gain of preamplifiers connected to the outputs of the hydrophones, comprising:
   determining an energy value ($W_i$) for the received signal of each group of hydrophones;
   determining a median energy curve ($W_m(\theta)$) from the energy values ($W_i$) as a function of the sequence of the groups of hydrophones;
   forming a correction value for the signal received from each group of hydrophones from a comparison of the respective energy value ($W_i$) with the energy curve ($W_m(\theta)$); and
   correcting each received signal with a respective one of the correction values 2. A method as defined in claim 1, wherein said step of determining the median energy curve ($W_m(\theta)$) includes averaging over time the energy values ($W_i$) for each group of hydrophones and performing a subsequent regression calculation as a function of the sequence of the groups of hydrophones.

3. A method as defined in claim 1, wherein said step of determining the median energy curve ($W_m(\theta)$) includes determining the median energy curve from a given number of elements of a series of orthogonal functions used to describe the median energy curve in consideration of the geometry of the transducer arrangement, and determining the coefficients of the elements of the series by linear transformation of the energy values ($W_i$).

4. A method as defined in claim 3, wherein the transducer arrangement has a cylindrical geometry and said step of determining the median energy curve includes determining the median energy curve by means of a Fourier series.

5. A method as defined in of claim 4, wherein said step of forming a correction value includes forming a correction value ($K_i$) for the received signal of each group of hydrophones by taking the square root of the corresponding energy value obtained by the Fourier series divided by the energy value ($W_i$) for that group of hydrophones, and said correcting step includes multiplying the received signal of that group by the correction value ($K_i$).

6. A method as defined in claim 3, wherein the transducer arrangement has an elongated geometry and said step of determining the median energy curve includes determining the median energy curve by means of a series of Legendre polynomials.

7. A method as defined in claim 1, wherein said step of forming a correction value includes forming a correction value for each group of hydrophones by forming a difference between the energy value ($W_i$) and the median energy curve ($W_m(\theta)$), and said correcting step includes adding the correction values to the respective energy value ($W_i$) for determining corrected energy values 8. A method as defined in claim 1, wherein said step of forming a correction value includes forming, for each group of hydrophones, a correction value ($K_i$) obtained from the square root of the ratio of the median energy value ($W_{mi}$) of the median energy curve ($W_m(\theta)$) to the energy value ($W_i$), and said correcting step includes multiplying each received signal by the correction value ($K_i$).

9. A circuit for compensating sensitivity fluctuations in signals received from respective groups of hydrophones for the purpose of subsequent signal processing, the groups being arranged in a predetermined sequence (0, 1, 2, . . . i) to form a transducer arrangement, wherein the received signals are influenced by the sensitivity of the hydrophones or a gain of preamplifiers connected to the outputs of the hydrophones, comprising:
   a plurality of preamplifiers each coupled for receiving the signals from a respective one of the groups of hydrophones and producing amplified received signals;
   squaring and integration means coupled via first connection means to the respective preamplifiers for forming an energy value ($W_i$) of the amplified received signals for each group of hydrophones;
   correction value computing means connected to said squaring and integration means for determining a median energy curve ($W_m(\theta)$) for the signals received from the groups of hydrophones and calculating correction values ($K_i$) as a function of the median energy curve ($W_m(\theta)$) for the signals received from each group of hydrophones; and
   multiplier means having one input connected via second connection means to said plurality of preamplifiers and a second input connected for receiving the correction values ($K_i$) from said correction value computing means, said multiplier means multiplying the each amplified received signal with a respective one of the correction values ($K_i$) to produce received signals corrected with the respective correction values at its output.

10. A circuit as defined in claim 9, further comprising bandwidth limitation filter means coupled to the outputs of said preamplifiers and having output means connected to said squaring and integration means.

11. A circuit as defined in 9, wherein said multiplier means includes an intermediate storage means for storing data input to said multiplier means.

12. A circuit as defined in claim 9, further comprising analog to digital converter means connected to the respective outputs of said preamplifier for converting the amplified received signals to digital signals.

13. A circuit as defined in claim 9, wherein said correction value computing means includes threshold checking means for detecting extreme correction values ($K_i$) that exceed a predetermined threshold and for blocking the received signals of the respective groups of hydrophones which have such extreme correction values ($K_i$).

14. A circuit for compensating sensitivity fluctuations in signals received from respective groups of hydrophones for the purpose of subsequent signal processing, the groups being arranged in a predetermined sequence (0, 1, 2, . . . i) to form a transducer arrangement, wherein the received signals are influenced by the sensitivity of the hydrophones or a gain of preamplifiers connected to the outputs of the hydrophones, comprising:
   a plurality of preamplifiers each coupled for receiving the signals from a respective one of the groups of hydrophones and producing amplified received signals;

squaring and integration means coupled via first connection means to the respective preamplifiers for forming an energy value ($W_i$) of the amplified received signals for each group of hydrophones;

correction value computing means connected to said squaring and integration means for determining a median energy curve ($W_m(\theta)$) for the signals received from the groups of hydrophones and calculating correction values ($K_i$) as a function of the median energy curve ($W_m(\theta)$) for the signals received from each group of hydrophones; and direction forming means, having one input connected, via second connection means, to said plurality of preamplifiers and a second input connected for receiving the correction values ($K_i$) from said correction value computing means, said direction forming means determining the direction of incidence of the received signal on said transducer arrangement by way of coefficient multipliers which are combined with the correction values ($K_i$).

15. A circuit as defined in claim 14, further comprising bandwidth limitation filter means coupled to the outputs of said preamplifiers and having output means connected to said squaring and integration means.

16. A circuit as defined in claim 14, further comprising analog to digital converter means connected to the respective outputs of said preamplifier for converting the amplified received signals to digital signals.

17. A circuit as defined in claim 14, wherein said correction value computing means includes threshold checking means for detecting extreme correction values ($K_i$) that exceed a predetermined threshold and for blocking the received signals of the respective groups of hydrophones which have such extreme correction values ($K_i$).

* * * * *